(12) United States Patent
Hauck et al.

(10) Patent No.: US 8,580,878 B2
(45) Date of Patent: *Nov. 12, 2013

(54) RADIATION-CURABLE PRINTING INK OR PRINTING VARNISH

(75) Inventors: Martin Hauck, Weil Der Stadt (DE); Wolfgang Schaefer, Horb (DE); Roland Kuenzel, Leverkusen (DE); Klaus Meyer, Dormagen (DE); Norbert Kinzel, Cologne (DE)

(73) Assignee: Marabu GmbH & Co. KG, Tamm (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/992,395

(22) PCT Filed: May 13, 2009

(86) PCT No.: PCT/EP2009/003387
§ 371 (c)(1),
(2), (4) Date: Feb. 2, 2011

(87) PCT Pub. No.: WO2009/138215
PCT Pub. Date: Nov. 19, 2009

(65) Prior Publication Data
US 2011/0118377 A1 May 19, 2011

(30) Foreign Application Priority Data
May 14, 2008 (DE) .......................... 10 2008 023 499

(51) Int. Cl.
*C09D 11/00* (2006.01)
*C08F 2/46* (2006.01)
*C08J 3/28* (2006.01)

(52) U.S. Cl.
USPC ........... 524/323; 524/326; 524/341; 523/160; 523/161

(58) Field of Classification Search
USPC ........... 522/163, 172; 523/160, 161; 524/323, 524/326, 341
See application file for complete search history.

(56) References Cited

U.S. PATENT DOCUMENTS

| | | |
|---|---|---|
| 2,999,846 A | 9/1961 | Schnell et al. |
| 4,322,490 A * | 3/1982 | Molaire ..................... 430/281.1 |
| 5,648,414 A | 7/1997 | Bier et al. |
| 2004/0152799 A1 | 8/2004 | Miller et al. |
| 2006/0154082 A1 | 7/2006 | Miller et al. |

FOREIGN PATENT DOCUMENTS

| | | |
|---|---|---|
| CN | 1120567 | 2/1985 |
| CN | 1727417 | 2/2006 |
| DE | 1570703 | 2/1970 |
| DE | 2063050 | 7/1972 |
| DE | 2063052 | 7/1972 |
| DE | 2211956 | 10/1973 |
| DE | 3832396 | 2/1990 |
| EP | 0359953 | 3/1990 |
| EP | 0688839 | 12/1995 |
| EP | 0691201 | 1/1996 |
| FR | 1561518 | 3/1969 |
| GB | 2370279 | 6/2002 |
| JP | 02-003434 | 1/1990 |
| JP | 08-003502 | 1/1996 |
| JP | 2997636 | 1/2000 |
| JP | 2001294793 | 10/2001 |
| JP | 2002275405 | 9/2002 |
| JP | 2003145573 | 5/2003 |
| JP | 2003145574 | 5/2003 |
| JP | 2004067838 | 3/2004 |
| JP | 2004314552 | 11/2004 |
| JP | 2006518781 | 8/2006 |
| JP | 2008063501 | 3/2008 |
| JP | 2008087248 | 4/2008 |
| JP | 2008105420 | 5/2008 |
| WO | 0250186 A | 6/2002 |
| WO | 2006015960 A | 2/2006 |
| WO | 2006098676 | 9/2006 |

OTHER PUBLICATIONS

Sherman et al. Solvent Replacement for Green Processing. Environmental Health Perspectives. vol. 6 , Supplement 1, (1998), pp. 253-271.*
Maeda et al. Paper Coating Varnish. Bulletin of the Japanese Society of Printing Science and Technology. vol. 39 (No. 6), pp. 383-387 (2002) *abstract only.*
Weiss. Painting & Coating: A Mature Industry in Transition. Prog. Polymer Science: vol. 22, pp. 203-245 (199).*
Guide, RadTech Printer'S. "UV&EB Chemistry and Technology."*
McGinniss, V. D. 2000. Radiation Curing. Kirk-Othmer Encyclopedia of Chemical Technology.—"Radiation Curing".*

* cited by examiner

*Primary Examiner* — Sanza McClendon
(74) *Attorney, Agent, or Firm* — Lucas & Mercanti, LLP; Klaus P. Stoffel

(57) ABSTRACT

The invention relates to a printing ink or printing varnish containing non-radiation-curable, preferably aromatic polycarbonate, in particular as a binder and adhesive component. According to the invention, the polycarbonate is provided with radiation-curable monomers, in particular is dissolved therein.

13 Claims, No Drawings

RADIATION-CURABLE PRINTING INK OR PRINTING VARNISH

BACKGROUND OF THE INVENTION

The present invention relates to a printing ink or a printing varnish according to the preamble of the main claim as well as to its use for different printing methods.

Printing inks based on solid resins, in particular polycarbonate, are known from the prior art that are typically dissolved in halogen-free solvents. EP 0 688 839 B1 describes a printing ink of this type, acknowledged as category-defining, and is included in the present application with regard to the polycarbonate it describes as a possible embodiment of the binder belonging to the invention.

However, this printing ink known from the prior art is disadvantageous insofar as the solvent-containing printing inks known from the prior art tend to dry up in the screen as a result of evaporation of the solvent, in particular after a specific service life without printing. This therefore results in screen obstruction and additional cleaning is necessary. In the worst case scenario the sieve therefore becomes unusable. A further drawback of this technology known from the prior art is that the printing ink has to be dried using warm air in a tunnel dryer or kiln; processing is thus lengthened by the time required for drying and therefore cannot be optimised as desired. There is also an increased need for space and energy, which leads to a rise in costs, as a result of the IR dryer used for heat-drying.

A radiation-curable resin provided with reactive monomers that are also UV-curable is further known from the prior art. The related document GB 2 370 279 A describes a radiation-curing polyurethane acrylate with a polycarbonate component in the chemical structure, although it exhibits drawbacks with regard to workability. The problem of poor adhesion during 'insert moulding' processes, i.e. during the processing method in which a polycarbonate film printed using the printing ink is again insert moulded onto the printing face with a thermoplastic polymer, is particularly evident when printing on polycarbonate substrates. Since the ink lies between the polycarbonate film and injection moulding material, similar to a sandwich, the film cannot be rubbed off during daily use. A further drawback of this prior art is the adhesion to the mould during forming as well as the high sensitivity of the printed image to pressure and temperature, which in turn leads to detrimental washing out during insert moulding and consequently to a poor printed image.

SUMMARY AND DESCRIPTION OF THE INVENTION

The object of the present invention is therefore to provide a printing ink whereby the adhesion of the printing ink and/or of the printing varnish relative to the substrate is improved and optimised. In particular the necessity of the use of volatile solvents is excluded so an undesired drying up in the screen during the printing process and the necessary subsequent thinning with a solvent are avoided and the processing time is thus reduced. Finer details can thus be printed and greater printing quality can therefore be achieved. A detrimental washing out or worsening of the printed image can be avoided in the further processing step of insert moulding.

The object is achieved by the printing ink or printing varnish having the features of the main claim; advantageous developments of the invention are described in the sub-claims.

In accordance with the invention it was initially advantageously and surprisingly found that different radiation-curable monomers can actually bring the thermoplastic polycarbonate resin into a stable solution and are suitable for film formation therewith by UV curing. In accordance with the invention this is advantageously utilised so the resultant printing ink and/or printing varnish does not dry up in the screen during a screen printing process, and furthermore no detrimental subsequent thinning and/or cleaning of the screen is necessary. Curing is preferably and typically carried out under UV radiation, LED curing or optionally with electron beam curing, typical curing times of considerably less than 1 sec leading to very rapid curing of the liquid printing ink and/or of the printing varnish. After curing, the prints can be finished directly without any extra temperature addition, for example by a tunnel dryer. The processing time for prints realised in this manner is thus considerably reduced and productivity is increased. It is also advantageous that fine details can be printed as a result of the avoidance of any washing out or the like in combination with the best possible adhesion to the film substrate, and potential further fields of application are therefore made accessible with the screen printing process.

Within the scope of the invention the expression 'UV curable' or 'radiation-curable' is also to be understood as 'cross-linkable', which means that the ink film can be cured using radical chain polymerisation. The difference between solvents previously used conventionally in the prior art and the curable monomer employed according to the invention, which is employed as a solvent medium for the polycarbonate resin, lies in the fact that in accordance with the conventional understanding the solvent is released into the air when the ink dries, whilst by contrast the curable monomers are bound or remain in the ink film. Environmental pollution caused by VOCs (volatile organic compounds) that may be produced when the solvent is removed during drying of a solvent-based system is thus avoided. The considerably more compact UV curing system also requires considerably less space in the printing room. A further advantage of UV curing lies in the lower energy consumption compared to a tunnel dryer, which is employed to dry the solvent-based system.

In this context the expression 'non-radiation-curable' also particularly means the absence of a reactive double bond.

Similarly to all printing inks and/or printing varnishes, radiation-curing printing inks can also contain lots of different components in addition to the binders contained according to the invention and must naturally be adapted to the respective application and the printed substrate. For example pigments, fillers and additives are examples of these different components and are generally only required in very small amounts, but are often advantageous for problem-free processing.

The thermoplastic non-UV-curable polycarbonate resin, in conjunction with the typically non-volatile (or at best poorly volatile) monomer, advantageously ensures that the ink is firmly fixed to a substrate (for example a polymer film) and the finished print thus advantageously withstands the stresses caused by abrasion, heat and mechanical deformation as well as the conditions that normally prevail during insert moulding of the printed film. In addition no subsequent thinning or the like, as is required for example with halogen-free solvents from the prior art, is necessary as an additional process step during processing owing to the non-volatility of the individual components of the printing ink.

It is also advantageous that the polycarbonates used in accordance with the invention are highly heat-resistant as well as very versatile and are therefore ideally suited for injection moulding processes or the like.

The polycarbonates from Bayer Material Science AG known from the aforementioned EP 0 688 839 B1 are particularly suitable for practical implementation of the invention, but in contrast to the known prior art they are provided dissolved in a UV-curable or radiation-curable monomer, or in a mixture of curable monomers within the scope of the present invention.

The printing inks or printing varnishes according to the invention are suitable for production of a laminate in such a way that the printing face of a substrate printed with the printing ink according to the invention is processed by insert moulding with a (thermoplastic) polymer to form the laminate. A printed object that is optimally protected against abrasion can thus be produced in the above-mentioned manner, the typeface of the object also being optimised. For further disclosure of a laminate or object thus produced of this type, reference is made to the basic procedure according to EP 0 691 201 B1, in particular with regard to layer formation, the substrate used and the further thermoplastic polymer.

The main advantage of the present invention lies in that it is possible to achieve improved adhesion of the ink to the substrate to be printed, formability of this coated substrate without causing damage to the ink layer and backfilling of a coated substrate of this type with thermoplastic polymers without washing out or destroying the ink layer as a result of the printing ink employed, for which the polycarbonate is dissolved in UV-curable monomers, thus making it possible to achieve simple radiation-curability, preferably UV-curability of the ink. The glass transition temperature of the ink according to the invention can vary in a range from 216° C. (glass transition temperature of a polycarbonate binder employed) to values of >30° C. The glass transition temperature of the polycarbonate employed as a binder in the ink according to the invention can lie both beneath and above the glass transition temperature of the substrate. However it may be advantageous for the glass transition temperature of the polycarbonate used as a binder to lie above the glass transition temperature of the substrate. The glass transition temperature is determined in accordance with ISO 11357.

Further advantages, features and details of the present invention will emerge from the following description, including the structural formulae, formulations, procedures and parameters disclosed therein. Within the scope of the present invention these are deemed to be disclosed as pertaining to the invention in any combination. In order to avoid making any repetitions, features disclosed with reference to substances and materials will also be deemed and claimable as having been disclosed with reference to methods and processes. Features disclosed with reference to methods and processes will also be deemed and claimable as having been disclosed with reference to substances and materials.

For example the printing method may be a screen printing, rotary screen printing, pad printing, offset printing, flexographic, gravure or inkjet printing method. The screen printing method is preferred.

The ink is preferably cured with UV light in a wavelength range of 200 to 450 nm and sufficient to achieve complete curing of the printing ink or printing varnish. The ink or varnish may also alternatively be cured without the use of photoinitiators with electron beams. Where the expression 'UV-curable' is used hereinafter, curing with a further type of radiation, for example electron beams should thus be understood as an alternative. LED units that irradiate virtually monochromatic light in the UV light range or close to the UV light range can also be used to dry the UV-curable inks.

The entire colour palette can be printed. If printed by screen printing, a screen fabric 100-40 to 180-27, preferably 140-34 or 150-31 is preferably used, which results in an ink layer thickness of 5-12/µm. Depending on the printing job and printing press, curing is carried out with commercially available mercury medium pressure lamps or mercury-doped lamps with 80-400 W/cm, preferably 120 to 200 W/cm that are substantially focussed. The exposure time is coupled with the printing speed since the printing and exposure devices are coupled. A conventional printing speed of 1-50 prints/min is normal when printing the films.

Binders are required (for example for the abrasion-proof decoration of injection moulded parts by film insert moulding) that do not melt at the high injection moulding temperatures, simultaneously adhere firmly to the substrate and are versatile. These requirements are satisfied by special polycarbonates that are dimensionally stable under heat.

The subject-matter of the invention is preferably versatile, heat-resistant printing inks or varnishes that contain A) as a binder at least one polycarbonate, preferably based on geminally distributed dihydroxy diphenyl cycloalkanes, B) as a solvent radiation-curing monomers, preferably UV-curing monomers or monomer mixtures.

Suitable polycarbonates are preferably high-molecular, thermoplastic, aromatic polycarbonates with $M_w$ (weight average molecular weight) of at least 10,000, preferably from 20,000 to 300,000 that contain bifunctional carbonate structural units of formula (I),

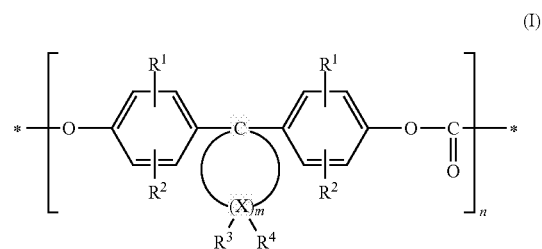

where $R^1$ and $R^2$ represent, independently of one another, hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$ alkyl, in particular benzyl, m represents an integer from 4 to 7, preferably 4 or 5, $R^3$ and $R^4$ represent, individually selectable for each X and independently of one another, hydrogen or $C_1$-$C_6$ alkyl and X represents carbon, and n represents an integer of 30 or more, particularly preferably an integer from 50 to 900, most preferably an integer from 60 to 250, with the proviso that $R^3$ and $R^4$ simultaneously represent alkyl on at least one atom X.

Starting products for the polycarbonates are dihydroxy diphenyl cycloalkanes of formula (Ia)

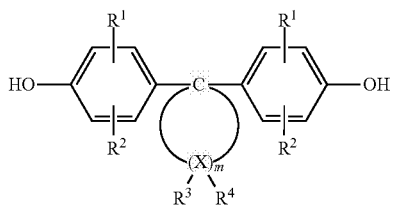

(Ia)

where
X, $R^1$, $R^2$, $R^3$, $R^4$ and m and n have the same meaning as given for formula (I).

$R^3$ and $R^4$ are preferably simultaneously alkyl on 1-2 atoms X, particularly only on one atom X.

The preferred alkyl radical is methyl; the X atoms in the alpha position to the diphenyl-substituted C atom (C-1) are preferably not dialkly-substituted, in contrast the alkyl disubstitution in the beta position to C-1 is preferred.

Dihydroxy diphenyl cycloalkanes with 5 and 6 ring C atoms in the cycloaliphatic radical (m=4 or 5 in formula (Ia)) are preferred, for example the diphenols of formulae (Ib) to (Id),

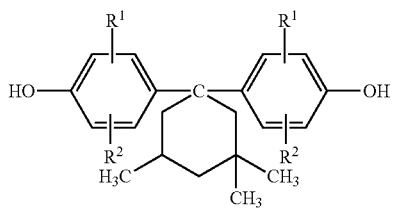

(Ib)

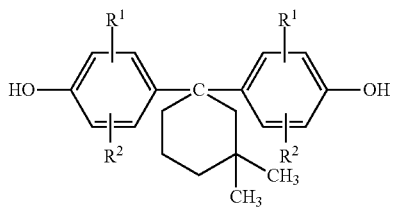

(Ic)

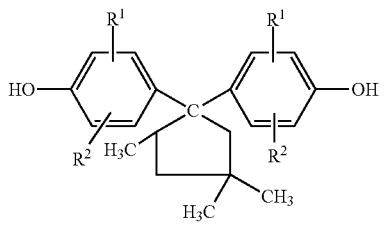

(Id)

in which 1,1-bis-(4-hydroxy phenyl)-3,3,5-trimethyl cyclohexane (formula (Ib) where $R^1$ and $R^2$ equal H) is particularly preferred. In accordance with German patent application P 3 832 396.6 and EP-A 0 359 953, the polycarbonates can be prepared from diphenols of formula (Ia).

Both a diphenol of formula (Ia) with formation of homopolycarbonates and a plurality of diphenols of formula (Ia) with formation of copolycarbonates can be used.

In addition the diphenols of formula (Ia) can also be used in a mixture with other diphenols, for example with those of formula (Ie)

HO—Z—OH    (Ie), for preparation of high-molecular, thermoplastic, aromatic polycarbonates.

Other suitable diphenols of formula (Ie) are those in which Z is an aromatic radical with 6 to 30 C atoms that can contain one or more aromatic nuclei, can be substituted and can contain aliphatic radicals or cycloaliphatic radicals other than those of formula (Ia) or heteroatoms as bridging links.

Examples of the diphenols of formula (Ie) include: hydroquinone, resorcin, dihydroxy diphenyls, bi-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, alpha,alpha'-bis-(hydroxyphenyl)-diisopropylbenzenes and the nucleus-alkylated and nucleus-halogenated compounds thereof.

These and further suitable diphenols are described, for example, in U.S. Pat. Nos. 3,028,365, 2,999,835, 3,148,172, 3,275,601, 2,991,273, 3,271,367, 3,062,781, 2,970,131 and 2,999,846, in DE-A 1 570 703, 2 063 050, 2 063 052, 2 211 956, Fr-A 1 561 518 and in the monograph "H. Schnell, Chemistry and Physics of Polycarbonates, Interscience Publishers, New York 1964".

Examples of further preferred diphenols include:
4,4'-dihydroxy diphenyl, 2,2-bis-(4-hydroxyphenyl)-propane, 2,4-bis-(4-hydroxyphenyl)-2-methyl butane, 1,1-bis-(4-hydroxyphenyl-cyclohexane, alpha,alpha-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, alpha,alpha-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols of formula (Ie) include:
2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-bis-(4-hydroxyphenyl)-propane is particularly preferred. The further diphenols can be used both individually and in a mixture.

The molar ratio of diphenols of formula (Ia) to the further diphenols of formula (Ie) that may optionally also be used is between 100 mol % (Ia) to 0 mol % (Ie) and 2 mol % (Ia) to 98 mol % (Ie), preferably between 100 mol % (Ia) to 0 mol % (Ie) and 10 mol % (Ia) to 90 mol % (Ie) and particularly between 100 mol % (Ia) to 0 mol % (Ie) and 30 mol % (Ia) to 70 mol % (Ie).

The high-molecular polycarbonates from the diphenols of formula (Ia), optionally in combination with further diphenols, can be prepared by known polycarbonate preparation processes. The different diphenols can be linked together both statistically and blockwise.

The polycarbonates according to the invention can be branched in a known manner. If branching is desired it is possible to achieve smaller amounts in a known manner by condensation, preferably amounts between 0.05 and 2.0 mol % (based on the diphenols employed), of three or more than three functional compounds, particularly those with three or more than three phenolic hydroxyl groups. Suitable branching agents with three or more than three phenolic hydroxyl groups include:

phloroglucine, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-is-(2-hydroxy-5-methyl-benzyl)-4-methylphenol, 2-(4-hydroxyphenyl)-2-(2,4-dihydroxyphenyl)-propane, hexa-[4-(4-hydroxyphenyl-isopropyl)-phenyl]-orthoterephthalate acid ester, tetra-(4-hydroxyphenyl)-methane, tetra-[4-(4-hydroxyphenyl-isopropyl)phenoxy]-methane and 1,4-bis-[4'4"-dihydroxytriphenyl)-methyl]-benzene.

Some of the other trifunctional compounds include 2,4-dihydroxybenzoic acid, trimesic acid, cyanuric chloride and 3,3-bis-(3-methyl-4-hydroxyphenyl)-2-oxo-2,3-dihydroindole.

Monofunctional compounds in normal concentrates are used as chain terminators for known control of the molecular weight of the polycarbonates. Suitable compounds include, for example, phenol, tert.-butylphenols or further alkyl-substituted phenols. In particular small amounts of phenols of formula (If)

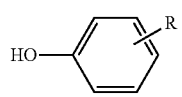

(If)

where

R represents a branched $C_8$ and/or $C_9$ alkyl radical are suitable for controlling molecular weight.

The proportion of $CH_3$ protons in the alkyl radical R is preferably between 47 and 89% and the proportion of CH and $CH_2$ protons is preferably between 53 and 11%; R is preferably also in the o- and/or p-position relative to the OH group, and the upper limit of the ortho proportion is particularly preferably 20%. The chain terminators are generally employed in amounts of 0.5 to 10, preferably 1.5 to 8 mol % based in the diphenols employed.

The polycarbonates can preferably be prepared in a known manner by the phase interface process (see H. Schnell "Chemistry and Physics of Polycarbonates", Polymer Reviews, Vol. IX, page 33 et seq., Interscience Publ. 1964).

The diphenols of formula (Ia) are dissolved in an aqueous alkaline phase. In order to prepare copolycarbonates with further diphenols mixtures of diphenols of formula (Ia) and the further diphenols, for example those of formula (Ie), are employed. Chain terminators, for example of formula (If) can be added to control molecular weight. Reaction with phosgene is then carried out in the presence of an inert organic phase, which preferably dissolves polycarbonate, by the method of phase interface condensation. The reaction temperature is between 0° C. and 40° C.

The branching agents that may optionally be used (preferably 0.05 to 2 mol %) can be either introduced into the aqueous alkaline phase with the diphenols or added dissolved in the organic solvent before phosgenation.

In addition to the diphenols of formula (Ia) and optionally further diphenols (Ie), the mono- and/or bis-chlorocarbonic acid esters thereof can also be used, these being added dissolved in organic solvents. The amount of chain terminators and branching agents depends on the molar amounts of diphenolate radicals corresponding to formula (Ia) and optionally formula (Ie); if chlorocarbonic acid esters are used the amount of phosgene can be correspondingly reduced in a known manner.

Examples of suitable organic solvents for the chain terminators and optionally for the branching agents and the chlorocarbonic acid esters include methylene chloride, chlorobenzene, and in particular mixtures of methylene chloride and chlorobenzene. The chain terminators and branching agents used can optionally be dissolved in the same solvent.

For example methylene chloride, chlorobenzene and mixtures of methylene chloride and chlorobenzene are used as the organic phase for the phase interface polycondensation.

For example NaOH solution is used as the aqueous alkaline phase. The preparation of polycarbonates by the phase interface process can be catalyzed conventionally by catalysts such as tertiary amines, in particular, tertiary aliphatic amines such as tributylamine or triethylamine; the catalysts can be employed in amounts of 0.05 to 10 mol % based on moles of diphenols employed. The catalysts can be added before the start of phosgenation, during phosgenation or else after phosgenation.

The polycarbonates can be prepared by the known process in homogeneous phase, the 'pyridine process' as well as by the known melt transesterification process with use of, for example, diphenylcarbonate instead of phosgene.

The polycarbonates preferably have a molecular weight $M_w$ (weight average, ascertained by gel chromatography after prior calibration) of at least 10,000, particularly preferably from 20,000 to 30,000 and in particular from 20,000 to 80,000. They can be linear or branched and they are homopolycarbonates or copolycarbonates based on the diphenols of formula (Ia).

New polycarbonates that have greater dimensional stability under heat and also exhibit good properties are produced by the introduction of diphenols of formula (Ia). This is particularly true for the polycarbonates based on diphenols of formula (Ia), in which m is 4 or 5, and most particularly for the polycarbonates based in diphenols (Ib), where $R^1$ and $R^2$, independently of one another, have the meaning given for formula (Ia) and are particularly preferably hydrogen.

The particularly preferred polycarbonates are thus those where m is 4 or 5 in their structural units of formula (I), most particularly those from units of formula (Ig)

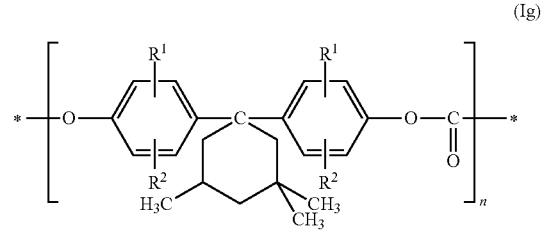

(Ig)

where $R^1$, $R^2$ and n have the meaning given for formula (I), but are particularly preferably hydrogen.

In addition to high dimensional stability under heat, these polycarbonates based on the diphenols of formula (Ib), where $R^1$ and $R^2$ are particularly hydrogen, also exhibit good UV stability and good flow behaviour in the melt, which was unexpected, and display very good solubility in the monomers mentioned below.

As a result of the arbitrary composition with further diphenols, particularly with those of formula (Ie), the polycarbonate properties can also be varied advantageously. In copolycarbonates of this type the diphenols of formula (Ia) are contained in polycarbonates in amounts of 100 mol % to 2 mol %, preferably in amounts of 100 mol % to 10 mol % and particularly in amounts of 100 mol % to 30 mol % based on the total amount of 100 mol % of diphenol units.

Particularly preferred polycarbonates are copolycarbonates of formula (I-h), in which the comonomers can be arranged alternately, in a block-like manner or randomly in the copolymers, p+q=n and the ratio of q and p to one another is such that the mol % figures given above in the previous section for formulae (Ie) and (Ia) mirror this.

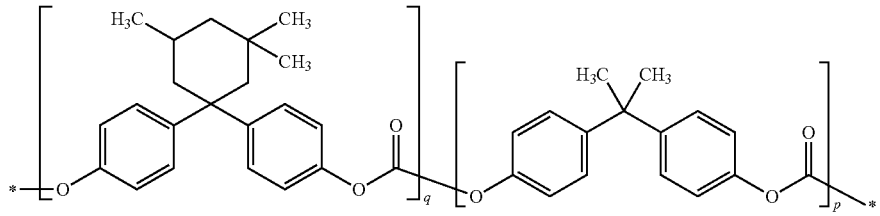

In order to produce the printing ink or printing varnish according to the invention, the copolycarbonate used is dissolved in one or more UV-curable monomers that are not cross-linkable, for example based on acrylate groups suitable for polymerisation or ethylenically unsaturated groups. These monomers are preferably monofunctional acrylates. However, difunctional, trifunctional or greater functional acrylates or methacrylates can also be used.

These UV-curable or radiation-curable monomers are used to dissolve the polycarbonate, but are based on a further principle compared to the solvents as employed and understood, for example, in EP 0 688 839 B1. In the conventional sense the solvents, as understood for example in EP 0 688 839 B1, are only used to dissolve the polycarbonate. Where possible, as a result of the subsequent drying of the ink the solvents evaporate completely, i.e. virtually 100%, and therefore have no film-forming properties. However, in the present invention cross-linkable monomers are used that also dissolve the polycarbonate although they remain in the ink, at most 100%, in such a way that they have a significant effect on the properties of the cured ink and decisively influence the film properties. The volatility of the radiation-curable monomers should preferably be less than 5%, most preferably less than 1%.

By way of non-limiting example, the following can be used as cross-linkable monomers: isobornyl(meth)acrylate (IBO (M)A), 2-phenylethyl(meth)acrylate (PE(M)A), ethoxylated 2-phenylethoxy acrylates, methoxylated polyethylene glycol mono(meth)acrylates, alkoxylated tetrahydrofurfuryl(meth) acrylate, alkoxylated lauryl acrylate, alkoxylated phenyl acrylate, stearyl(meth)acrylate, lauryl(meth)acrylate, isodecyl(meth)acrylate, isooctyl acrylate, octyl acrylate, tridecyl (meth)acrylate, caprolactone acrylate, ethoxylated or alkoxylated nonylphenol(meth)acrylate, cyclic trimethylolpropane formal acrylate, glycidyl methacrylate, propylene glycol monomethacrylate, 2-(2-ethoxyethoxy)ethylacrylate (EOEOEA), methylmethacrylate (MMA), propoxylated allyl methacrylate, ethoxylated hydroxyethyl methacrylates, ethoxytriglycol methacrylate, 1,6-hexanediol di(meth)acrylate (HDD(M)A), alkoxylated hexanediol diacrylates, alkoxylated cyclohexane dimethanol di(meth)acrylates, 1,3-butylene glycol di(meth)acrylate, 1,4 butanediol di(meth) acrylate, diethylene glycol di(meth)acrylate, polyethylene glycol (200) diacrylate, polyethylene glycol (400) di(meth) acrylate, polyethylene glycol (600) di(meth)acrylate, ethoxylated bisphenol A di(meth)acrylates, tetraethylene glycol di(meth)acrylate, triethylene glycol di(meth)acrylate, ethyleneglycoldimethacrylate, polyethylene glycol dimethacrylate, dipropylene glycol diacrylate (DPGDA), alkoxylated neopentylglycol di(meth)acrylate, propoxylated trimethylolpropane triacrylate, trimethylolpropane tri(meth)acrylate, propoxylated glyceryl triacrylate (GPTA), dipentaerythritol hexaacrylate (DPHA), tripropylene glycol diacrylate (TPGDA), dipentaerythritol pentaacrylate (DiPEPA), pentaerythritol triacrylate (PETIA), (ethoxylated) pentaerythritol tetraacrylate, ditrimethylolpropane tetraacrylate, trimethyl propane triacrylate (TMPEOTA), tricyclodecane dimethanol diacrylate (TCDDMDA), dipentaerythritol pentaacrylate, low-molecular monofunctional urethane acrylates, low-molecular epoxy acrylates, hydroxypropyl methacrylate (HPMA).

2-phenylethyl(meth)acrylate (PE(M)A), ethoxylated 2-phenylethoxy(meth)acrylate, tetrahydrofurfuryl methacrylate, 2-(2-ethoxyethoxy)ethylacrylate (EOEOEA), methyl methacrylate (MMA) and 1,6-hexanediol diacrylate (HDDA) are most particularly preferred from the above list.

Different vinyl ethers can also be used as cross-linkable monomers, for example but not limited to diethylene glycol divinyl ether (DVE-2) or triethylene glycol divinyl ether (DVE-3).

Non-limiting examples of compounds with an ethylenically unsaturated bond include N-vinylpyrrolidone (NVP), N-vinyl caprolactam, N-vinyl formamide (NVF) or acryloylmorpholine (ACMO). The used of n-vinylpyrrolidone (NVP) should be dispensed with where possible for known health reasons.

One or more additional UV-curable or radiation-curable monomers are generally added to the binder for printing inks or varnishes. These UV-curable monomers, which are also cured, may be the UV-curable monomers detailed above in conjunction with the copolycarbonate solution. The total amount of UV-curable monomers is generally 1-99 wt. %, preferably 25 to 85 wt. %, particularly 50 to 85 wt. %.

The monomers are cross-linked, for example by UV curing, LED curing or electron beam curing. These processes are already known from the literature and in various other prior art applications, for example when printing optical storage media.

The process of radiation curing may be combined by the present invention and its described advantages with in-mould process procedures, more specifically the insert moulding process.

No volatile organic solvent is preferably added to the printing ink or printing varnish. However, volatile solvent may be added in exceptional cases in order to optimise the printing ink or printing varnish for specific applications. Small amounts of solvents can be introduced into the ink by the addition of additives since a large number of the commercially available active substances are dissolved in solvents or diluted by these. A maximum of 10%, preferably a maximum of 5% volatile organic solvent should be employed in the printing ink or printing varnish. However, the use of volatile organic solvents should particularly preferably be dispensed with.

The printing ink or printing varnish may further contain at least one further resin in addition to the polycarbonate used. The resins can be selected from a wide range of resins. Non-limiting examples include: epoxy resins, polyester resins, cellulose resins, methyl methacrylate copolymers (for example Paraloid B-48N, Paraloid B60, Paraloid B-82 from Rohm & Haas Deutschland GmbH, In der Krön 4, D 60489 Frankfurt, Neocryl B-810 from Neoresins Lurgiallee 6-8, D-60439 Frankfurt/Main); ethyl methacrylate (for example Paraloid B 72 from Rohm & Haas); butyl methacrylate copolymers (for example Degalan LP 65/12, Degalan LP 68/04 from Röhm GmbH & Co KG, Kirschenallee); liquid epoxy resins (for example Polypox E 064 from UPPC AG, Schemmerbergerstr. 39, D-88487 Mietingen, Rutapox resin 0164 from Bakelite AG, Araldite GY 250 from Vantico); unsaturated polyester resins (for example adhesion resin LTH from Degussa Chemiepark Mari, Paul-Baumann-Str. 1, 45764 Mari); saturated polyester resins (Dynapol L 912, Dynapol L 952 from Degussa). For example additional resins of this type may be present in an amount from 0 to 50 wt. % dry weight based on the total mass of the ink or varnish, preferably from 0 to 20 wt. %, particularly preferably 0 to 5 wt. % so as to optimise specific properties, such as adhesion. However, with regard to the amount added of these additional passive or inert resins that are chemically distinct from the polycarbonate used as the main resin, it should be remembered that they generally increase the risk of washing out of the ink during insert moulding.

The inks or varnishes according to the invention preferably contain at least one photoinitiator, usually two and possibly three or more photoinitiators in order to initiate surface-curing and deep-curing (cross-linking) of the inks with UV light. Photoinitiators with minimal tendency for migration and minimal volatility are preferred in order to avoid negative effects, such as delamination of the ink from the injected material. The photoinitiators used should also exhibit a minimal tendency for yellowing so the ink of the component is not changed and/or distorted.

They can be selected from the photoinitiators used in conventional UV-curing printing inks and varnishes, etc. Non-limiting examples include 1-hydroxycyclohexyl acetophenone (Irgacure® 184 from Ciba Spezialitätenchemie AG, Klybeckstrasse 141, Postfach, CH-4002 Basel), 2-methyl-1-[4-(methylthiophenyl)-2-morpholinopropan]-1-one (Irgacure® 907 from Ciba), 2-hydroxy-1-[4-(2-hydroxyethoxy)phenyl]-2-methyl-1-propanone (Irgacure® 2959 from Ciba), a-dimethoxy-a-phenylacetophenone (Irgacure® 651 from Ciba), 2-benzyl-2-dimethylamino-1-(4-morpholinophenyl)butan-1-one (Irgacure® 369 from Ciba), bis(2,4,6-trimethylbenzoyl)phenyl phosphine oxide (Irgacure® 819 from Ciba), 2-hydroxy-2-methyl-1-phenyl-1-propanone (Darocur® 1173 from Ciba), isopropyl thioxanthone (ITX from Lambson), 2-chloro thioxanthone (CTX from Lambson), benzophenone, 2,4,6-trimethylbenzenediphenylphosphine oxide (TPO from BASF), ethyl-2,4,6-trimethylbenzoylphenylphosphinate (TPO-L from BASF) and methylbenzoylformate (MBF from Lambson).

The amount added is highly dependent on the selection of the printing method and the type of photoinitiators used. The total amount of photoinitiators is generally 1 to 20 wt. %, preferably 2 to 10 wt. %, particularly preferably 3 to 7 wt. % based on the total mass of the printing ink or printing varnish.

In addition co-initiators such as amines (for example MDEA from BASF Aktiengesellschaft, Carl-Bosch-Straße 38, 67056 Ludwigshafen) or amine-modified acrylates (for example Ebecryl P115, Ebecryl 7100 from Surface Specialities UCB; Actilane 705, Actilane 715, Actilane 755 from Akzo Nobel Resins bv., Verkaufsbüro Deutschland, Industriestr. 8. 46446 Emmerich; Laromer PO 94 F, Laromer LR 8869 from BASF; Craynor503, Craynor 550 from Cray Valley; Photomer 4775F from Cognis) can also be employed in amounts of from 0.5 to 20 wt. % based on the total mass of the printing ink or printing varnish depending on the printing method and the type of photoinitiators used.

Bis(2,4,6-trimethylbenzoyl)phenylphosphine oxide (Irgacure® 819 from Ciba), 2-hydroxy-2-methyl-1-phenyl-1-propanone (Darocur® 1173 from Ciba) and trimethylbenzenediphenylphosphine oxide (TPO from BASF) are preferably employed.

A thickening agent may also be contained in the printing ink or varnish according to the invention and may also be selected from materials normally used for this purpose in printing inks and/or printing varnishes. Non-limiting examples of these include pyrogenic silicic acid, structurally modified phyllosilicates and castor oil derivatives subsequently treated with methacrylic silane as well as solutions of modified ureas or polyhydroxycarboxylic acid amides. The amount of thickening agent(s) used usually lies in a range from 0 to 10 wt. %, preferably 0.5 to 5 wt. % and particularly 1.5 to 3 wt. % based on the total mass of the printing ink or printing varnish.

The printing ink or varnish according to the invention generally also contains an antifoaming agent and/or a levelling agent. By way of non-limiting example, antifoaming agents can be selected from modified acrylates or modified acrylate copolymers, or else from silicone-containing compounds. For example levelling agents include modified polyacrylates and polysiloxanes.

However, depending on the printing method and the types of antifoaming agents and/or levelling agents used, these are generally employed in an amount of 0.1 to 2.5 wt. % based on the total mass of the printing ink or varnish. Silicone-free products are preferably used as antifoaming agents and levelling agents in order to avoid migration of these compounds and the possible subsequent delamination of the injected material from the ink.

By way of non-limiting example, Genorad 16 from Rahn and Florstab UV2 from Kromachem, 10, Park Industrial Centre, Tolpits Lane, Watford, Hertfordshire WD1 8SP, UK are preferably used as stabilisers.

The printing ink or printing varnish according to the invention may comprise one or more fillers. These fillers are used to reduce the cost and optimise the flow properties of the printing ink and/or printing varnish.

The nature of the fillers is not particularly critical. They can be selected from fillers normally used in printing inks and non-limiting examples include china clay, barium sulphate (in precipitated form as blanc fixe), calcium carbonate, zinc sulphide, silica, talcum, aluminium silicate, aluminium hydroxide and/or silicic acid. The amount of filler employed generally lies in a range from 0 to 50 wt. %, preferably 0 to 30 wt. %, for example 20 wt. % based on the total mass of the printing ink or varnish.

The pigments preferably contained in the printing ink according to the invention may be any desired pigments. By way of non-limiting example, titanium dioxide, zinc sulphide, pigment black, azodiaryl yellow, isoindole yellow, diarylide orange, quinacridone magenta, diketo pyrrolo red, copper phthalocyanine blue, copper phthalocyanine green, dioxazine violet and diketo metal oxide can be used.

A fairly comprehensive list of further pigments that may be employed can be found in the Colour Index International, Fourth Edition Online, 2001, published by the Society of Dyers and Colourists in association with the American Association of Textile Chemists and Colorists.

By way of non-limiting example, effect pigments such as metal-oxide-coated mica and metal pigments can also be employed. The amount of coloured pigment is usually 1 to 50 wt. %, preferably 3 to 45 wt. % based on the weight of the printing ink depending on the type of pigment, the desired covering power and the selected printing method. White pigment is usually employed in an amount of 20 to 50 wt. %, preferably 25 to 45 wt. %. The coloured pigments are generally employed in an amount of 1 to 20 wt. % depending on the type and shade as well as the printing method used. Metal-oxide-coated mica and metal pigments are generally employed in an amount of 1 to 20 wt. % depending on the type and shade as well as the printing method used. All pigments used must be very temperature-resistant and must not break down, sublimate or change shade as a result of the temperature produced during insert moulding.

Waxes can also be added in order to improve colour properties. Suitable waxes are commercially available. The waxes listed below are particularly considered, for example the commercially available products of the respective waxes being named; the respective supply sources are given in brackets:
Polyethylene Waxes:
Ceraflour 990 (Byk-Cera; Danzigweg 23; 7418 EN Deventer Netherlands)
Ceraflour 991 (Byk-Cera; Danzigweg 23; 7418 EN Deventer Netherlands)
Printwax ME 0825 (Deurex Micro-Technologies GmbH; Dr. Bergius Strasse 18/20; 06729 Tröglitz Germany)
Modified Polyethylene Waxes
Ceraflour 961 (Byk-Cera; Danzigweg 23; 7418 EN Deventer Netherlands)
Everglide UV 961 25% (Krahn-Chemie GmbH; Grimm 10; 20457 Hamburg Germany)
High Density Polyethylene Waxes
Ceraflour 950 (Byk-Cera; Danzigweg 23; 7418 EN Deventer Netherlands)
Polymer-Silicic Acid Compounds
Deuteron MM 659 (Deuteron GmbH; in den Ellern 2; 28832 Achim Germany)
Micronized Polyolefin Waxes
Micro Wax DM (Finma-Chemie GmbH, Theodor-Heuss-Strasse 5; 61191 Rosbach Germany)
Micro Wax HTDM (Finma-Chemie GmbH, Theodor-Heuss-Strasse 5; 61191 Rosbach Germany)
Fischer-Tropsch Waxes
Ceraflour 940 (Byk-Cera; Danzigweg 23; 7418 EN Deventer Netherlands)
Micronized Polytetrafluoroethylene Waxes
Ceraflour 980 (Byk-Cera; Danzigweg 23; 7418 EN Deventer Netherlands)
Ultraglide UV 701 (Krahn-Chemie GmbH; Grimm 10; 20457 Hamburg Germany)
Shamrock ST-3 (Shamrock; Heesterveldweg 21; 3700 Tongeren Belgium)
Micronized Polytetrafluoroethylene/Polyethylene Waxes
Ceraflour 968 (Byk-Cera; Danzigweg 23; 7418 EN Deventer Netherlands)
Ceraflour 996 (Byk-Cera; Danzigweg 23; 7418 EN Deventer Netherlands)
Amide Waxes
Ceraflour 994 (Byk-Cera; Danzigweg 23; 7418 EN Deventer Netherlands)
Deurex MA 7020 (Deurex Micro-Technologies GmbH; Dr. Bergius Strasse 18/20; 06729 Tröglitz Germany)
Carnauba Waxes
Ceraflour 4RC 1165 (Byk-Cera; Danzigweg 23; 7418 EN Deventer Netherlands)
Everglide UV 636 25% (Krahn-Chemie; Grimm 10; 20457 Hamburg Germany)
Montan Waxes
Deurex MM 8120 (Deurex Micro-Technologies GmbH; Dr. Bergius Strasse 18/20; 06729 Tröglitz Germany)
Deurex MM 8200 (Deurex Micro-Technologies GmbH; Dr. Bergius Strasse 18/20; 06729 Tröglitz Germany)
Micronized Ester Waxes with UV-Reactive Groups
Ceridust TP 5091 (Clariant GmbH; Am Unisyspark 1; 65843 Sulzbach Germany)
Paraffin Waxes
Polyspers HP (Eastman Chemical Deutschland GmbH; Charlottenstrasse 61; 5114 9 Cologne Germany)
Polypropylene Waxes
Crayvallack WN-1135 (Lubrizol Coating Additives GmbH; Max Planck Strasse 6; 27721 Ritterhude Germany)
Spray-Micronized Polyolefin Waxes
Printwax MXF 9510 D (Deurex Micro-Technologies GmbH; Dr. Bergius Strasse 18/20; 06729 Tröglitz Germany)
Printwax MX. 9815 D (Deurex Micro-Technologies GmbH; Dr. Bergius Strasse 18/20; 06729 Tröglitz Germany)

The concentration of wax is preferably 0 wt. % to 10 wt. %, more preferably 0 wt. % to 3.0 wt. % and particularly preferably 0-2 wt. % based on the weight of the printing ink or printing varnish.

Before printing, an adhesion promoter is added to the printing ink or varnish in an amount of 0.01 to 20 wt. %, preferably 1-10 wt. % based on the weight of the ink or varnish for printing. This adhesion promoter may be, for example, aliphatic polyisocyanates such as hexamethylene diisocyanate (HDI), trimethylhexane diisocyanate (TMHDI), cycloaliphatic polyisocyanates such as isophorone diisocyanate (IPDI), hydrated xylene diisocyanate (HXDI) or diisocyanate dicyclohexyl methane (HMDI), as well as aromatic polyisocyanates, such as toluene diisocyanate (TDI), xylene diisocyanate (XDI), tetramethyl xylene diisocyanate (TMXDI) or diisocyanatodiphenyl methane (MDI). Commercially available products include, for example, Desmodur E41 or Desmodur N 75 (Bayer). Polyamides, such as polyethylene imides and polycarbodiimides can also be employed. Further adhesion promoters include silane adhesion promoters such as alkylsilanes, vinylsilanes, methacryloxysilanes, epoxysilanes, aminosilanes, ureasilanes, chlorosalines and isocyanatosilanes as well as aminosilanes, for example gamma-aminopropyl triethoxysilane, gamma-aminopropyl trimethoxysilane, n-beta-(aminoethyl)-gamma-aminopropyl trimethoxysilane, bis(gamma-trimethoxysilylpropyl)-amine, n-phenyl-gamma-aminopropyl trimethoxysilane and n-beta-(aminoethyl)-gamma-aminopropylmethyl dimethoxysilane, and isocyanatosilanes such as gamma-isocyanatopropyltriethoxysilane.

Preferred printing methods include screen printing, rotary screen printing, digital printing, flexographic printing, letterpress printing, offset printing and gravure printing. Screen printing is particularly preferably used.

Non-limiting examples of conventional substrates that are printed with the printing ink or printing varnish and are used in the in-mould process include, inter alia, polycarbonate, pre-treated polyester, ABS, PMMA, polycarbonate/polyester blends, polycarbonate/ABS blends. The following films are supplied by Bayer Material Science (Bayfol®, Makrolon®, Makrofol®, Bayblend®), GE. Structured Products (Lexan®) and Autotype (Autoflex Hiform®, Autoflex Xtra-Form®). Films of polycarbonates or polycarbonate/polyester blends are preferably used as a substrate.

Conventional injection-moulding materials that can be used for insert moulding of the printing ink or printing varnish applied to the film are particularly, but not exclusively, polyester, polycarbonates, polystyrene, ABS and PMMA. Polycarbonate or various polycarbonate blends are preferred materials for insert moulding.

The following examples explain the invention in an exemplary manner and should not be considered as limiting.

PRACTICAL EXAMPLES

Preparation of Polycarbonates According to the Invention that are Suitable as Binders Exemplary polycarbonates of formula (I-h) were prepared as follows:

Polycarbonate 1

205.7 g (0.90 mol) of bisphenol A (2,2-bis-(4-hydroxyphenyl)-propane, 30.7 g (0.10 mol) of 1,1-bis-(4-hydroxyphenyl)-3,3,5-trimethyl cyclohexane, 336.6 g (6 mol) of KOH and 2700 g of water were dissolved in an inert gas atmosphere under stirring. A solution of 1.88 g of phenol was then added to 2500 ml of methylene chloride. 198 g (2 mol) of phosgene was introduced into the well-stirred solution at a pH of 13 to 14 and at 21 to 25° C. 1 ml of ethyl piperidine was then added and the mixture was stirred for a further 45 min. The bisphenolate-free aqueous phase was separated off, the organic phase was washed neutral with water after acidification with phosphoric acid and was desolventized. The polycarbonate exhibited a relative solution viscosity of 1.255.

The glass transition temperature of the polymer was determined at 157° C. (DSC).

Polycarbonate 2

As for polycarbonate 1, a mixture of 181.4 g (0.79 mol) of bisphenol A and 63.7 g (0.21 mol) of (1,1-bis-(4-hydroxyphenyl)-3,3,5-trimethyl cyclohexane were reacted to form polycarbonate.

The polycarbonate exhibited a relative solution viscosity of 1.263.

The glass transition temperature of the polymer was determined at 167° C. (DSC).

Polycarbonate 3

As for polycarbonate 1, a mixture of 149.0 g (0.65 mol) of bisphenol A and 107.9 g (0.35 mol) of (1,1-bis-(4-hydroxyphenyl)-3,3,5-trimethyl cyclohexane were reacted to form polycarbonate.

The polycarbonate exhibited a relative solution viscosity of 1.263.

The glass transition temperature of the polymer was determined at 183° C. (DSC).

Polycarbonate 4

As for polycarbonate 1, a mixture of 91.6 g (0.40 mol) of bisphenol A and 185.9 g (0.60 mol) of 1,1-bis-(4-hydroxyphenyl)-3,3,5-trimethyl cyclohexane were reacted to form polycarbonate.

The polycarbonate exhibited a relative solution viscosity of 1.251.

The glass transition temperature of the polymer was determined at 204° C. (DSC).

Polycarbonate 5

As for polycarbonate 1, a mixture of 44.2 g (0.19 mol) of bisphenol A and 250.4 g (0.81 mol) of 1,1-bis-(4-hydroxyphenyl)-3,3,5-trimethyl cyclohexane were reacted to form polycarbonate.

The polycarbonate exhibited a relative solution viscosity of 1.248.

The glass transition temperature of the polymer was determined at 216° C. (DSC).

The glass transition temperatures were determined using DSC (differential scanning calorimetry) in accordance with ISO 11357. The samples were previously dried for 24 hours in a vacuum oven in order to determine the glass transition temperatures.

Preparation of the Screen Printing Inks According to the Invention:

In order to illustrate the invention, screen printing inks were prepared as follows:

20 wt. % of the binder from Bayer Material Science (Polycarbonate 4, see above) was first dissolved in 80 wt. % of UV-curable monomer 4-(1-oxo-2-propenyl)morpholine. Further monofunctional acrylates, a diacrylate, photoinitiators, levelling agent, thickening agent and pigment were added to the binder dissolved in UV-curable monomer 4-(1-oxo-2-propenyl)morpholine, pre-dispersed with a dissolver and an ink with a fineness of grain of <10 μm was prepared using a three-roll mill or a bead mill.

The invention will now be described by examples 1 and 2 shown in Tab. 1 and 2, without being limited thereto.

Example 1

According to the Invention

Blue Ink for Screen Printing

TABLE 1

| Raw material | Percent by weight |
| --- | --- |
| Polycarbonate 4 (20 wt. %) in 4-(1-oxo-2-propenyl)morpholine (80 wt. %) | 72.00 |
| 1-ethenylazepan-2-one | 4.66 |
| 2-phenoxyethyl acrylate (Sartomer SR3339EU) | 6.44 |
| Tricyclodecane dimethanol diacrylate (Sartomer SR833S) | 5.00 |
| Polysiloxane (levelling agent) | 1.00 |
| Phenyl bis (2,4,6-trimethylbenzoyl)-phosphine oxide (photoinitiator) | 0.90 |
| 2-hydroxy-2-methyl-1-phenyl-1-propanone (photoinitiator) | 5.00 |
| Modified urea solution (thickening agent) | 1.00 |
| Sunfast blue 15:3 249-1532 (pigment) | 4.00 |

Example 2

According to the Invention

White Ink for Screen Printing

TABLE 2

| Raw material | Percent by weight |
| --- | --- |
| Polycarbonate 4 (20 wt. %) in 4-(1-oxo-2-propenyl)morpholine (80 wt. %) | 27.90 |
| 1-ethenylazepan-2-one | 7.60 |

TABLE 2-continued

| Raw material | Percent by weight |
|---|---|
| 2-phenoxyethyl acrylate (Sartomer SR3339EU) | 10.50 |
| 4-(1-oxo-2-propenyl)morpholine | 1.10 |
| Tricyclodecane dimethanol diacrylate (Sartomer SR833S) | 5.00 |
| Polysiloxane (levelling agent) | 1.00 |
| Phenyl bis (2,4,6-trimethylbenzoyl)-phosphine oxide (photoinitiator) | 0.90 |
| 2-hydroxy-2-methyl-1-phenyl-1-propanone (photoinitiator) | 5.00 |
| Modified urea solution (thickening agent) | 1.00 |
| Tiona 595 (pigment) | 40.00 |

The glass transition temperature of the ink according to the invention from Example 1 was determined at 156° C. and that of the ink from Example 2 was determined at 88° C.

In order to coat films with the screen printing inks according to the invention the screen printing inks from examples 1 and 2 with a viscosity of approx. 4,000 mPa*s (cone-plate system with a shear rate of 100/s) were each printed through a screen printing fabric 150-31 onto a polycarbonate film (Makrofol® DE-4; 375 μm; Bayer Material Science AG) and cured at a speed of 15 m/min using 2×120 W/cm strong mercury vapour lamps.

Example 3

According to the Invention

Blue Ink for Screen Printing

When preparing a further screen printing ink according to the invention 30 wt. % of the binder from Bayer Material Science (polycarbonate 5, see above) was dissolved in 70 wt. % of UV-curable monomer 4-(1-oxo-2-propenyl)morpholine.

A diacrylate, photoinitiators, levelling agent, thickening agent and pigment were added to the binder dissolved in UV-curable monomer 4-(1-oxo-2-propenyl)morpholine, pre-dispersed with a dissolver and an ink with a fineness of grain of <10 μm was prepared using a three-roll mill or a bead mill.

The invention will now be described by the Example shown in Tab. 3, without being limited thereto.

TABLE 3

| Raw material | Percent by weight |
|---|---|
| Polycarbonate 5 (30 wt. %) in 4-(1-oxo-2-propenyl)morpholine (70 wt. %) | 52.50 |
| 4-(1-oxo-2-propenyl)morpholine | 25.60 |
| Tricyclodecane dimethanol diacrylate (Sartomer SR833S) | 10.00 |
| Polysiloxane (levelling agent) | 1.00 |
| Phenyl bis (2,4,6-trimethylbenzoyl)-phosphine oxide (photoinitiator) | 0.90 |
| 2-hydroxy-2-methyl-1-phenyl-1-propanone (photoinitiator) | 5.00 |
| Modified urea solution (thickening agent) | 1.00 |
| Sunfast blue 15:3 249-1532 (pigment) | 4.00 |

The glass transition temperature of the ink according to the invention from Example 3 was determined at 160° (DSC).

In order to coat a film with the screen printing ink according to the invention the screen printing ink with a viscosity of approx. 4,000 mPa*s (cone-plate system with a shear rate of 100/s) was printed through a screen printing fabric 150-31 onto a polycarbonate film (Makrofol® DE-4; 375 μm; Bayer Material Science AG) and cured at a speed of 15 m/min using 2×120 W/cm strong mercury vapour lamps.

The following examples 4 to 7 were carried out for comparison:

Comparative Example 4

UV-Ink for Graphic Screen Printing

A commercially available screen printing ink with the composition according to Tab. 4 that contained a polyacrylate as a binder was printed and cured onto a polycarbonate film (Makrofol® DE-4; 375 μm, Bayer Material Science AG) in the manner described for examples 1 and 2.

TABLE 4

| UV ink for graphic screen printing | |
|---|---|
| Raw material | Percent by weight |
| MMA copolymer | 17.50 |
| 1-ethenylazepan-2-one | 9.00 |
| Isobornyl acrylate | 35.00 |
| 2-phenoxyethyl acrylate (Sartomer SR339EU) | 6.00 |
| Polysiloxane (levelling agent) | 1.00 |
| 2-hydroxy-2-methyl-1-phenyl-1-propanone (photoinitiator) | 3.50 |
| 2-benzyl-2-(dimethylamino)-1-[4-(4-morpholinyl)-1-butanone (photoinitiator) | 2.00 |
| Isopropyl thioxanthone (photoinitiator) | 0.70 |
| Diphenyl(2,4,6-trimethylbenzoyl)-phosphine oxide (photoinitiator) | 1.30 |
| Sunfast blue 15:3 249-1532 (pigment) | 4.00 |
| Barium sulphate (Sachtleben blanc fixe micro) | 20.00 |

Comparative Example 5

UV-Ink for Graphic Screen Printing

A commercially available screen printing ink with the composition according to Tab. 5 that contained a polyacrylate other than that of Comparative Example 4 as a binder was printed and cured onto a polycarbonate film (Makrofol® DE-4; 375 μm, Bayer Material Science AG) in the manner described for examples 1 and 2.

TABLE 5

| UV ink for graphic screen printing | |
|---|---|
| Raw material | Percent by weight |
| MMA copolymer | 24.00 |
| 1-6-hexanediol diacrylate (Sartomer SR238) | 23.00 |
| Isobornyl acrylate | 12.00 |
| 2-phenoxyethyl acrylate (Sartomer SR339EU) | 15.00 |
| Polysiloxane (levelling agent) | 1.00 |
| Phenyl bis (2,4,6-trimethylbenzoyl)-phosphine oxide (photoinitiator) | 0.90 |
| 1-hydroxycyclohexyl phenyl ketone (photoinitiator) | 7.00 |
| Sunfast blue 15:3 249-1532 (pigment) | 4.00 |
| Barium sulphate (blanc fixe micro) | 13.10 |

Comparative Example 6

UV-Ink for Graphic Screen Printing

A commercially available screen printing ink with the composition according to Tab. 6 that contained a polyurethane acrylate as a binder was printed and cured onto a polycarbonate film (Makrofol® DE-4; 375 μm, Bayer Material Science AG) in the manner described for examples 1 and 2.

TABLE 6

UV ink for screen printing

| Raw material | Percent by weight |
|---|---|
| Polyurethane acrylate | 46.00 |
| 1-ethenylazepan-2-one | 9.00 |
| Isobornyl acrylate | 22.00 |
| Polysiloxane (levelling agent) | 1.00 |
| Isopropyl thioxanthone (photoinitiator) | 1.00 |
| 2-methyl-1-[4-(methylthio)phenyl]-2-(morpholinyl)-1-propanone (photoinitiator) | 2.00 |
| Sunfast blue 15:3 249-1532 (pigment) | 4.00 |
| Barium sulphate (blanc fixe micro) | 15.00 |

Comparative Example 7

UV-Ink for the in-Mould Process

A commercially available screen printing ink from Coates (Decomold®) that contained a copolymer with an aliphatic polycarbonate backbone and oligomer urethane acrylate side chains as a binder was printed and cured onto a polycarbonate film (Makrofol® DE-4; 375 μm, Bayer Material Science AG) in the manner described for examples 1 and 2.

Example 8

Results of the Forming Tests

The thermoformability of the coated films (laminates) prepared in accordance with examples 1 to 7 was tested as described below.

The forming tests were carried out on a SAMK 360 high-pressure forming machine (HPF machine) produced in the year 2000 from Niebling. The tests were carried out with a heating-ventilating cavity mould in order to assess the forming properties. The dimensions of the component were approx. 190×120 mm with various ruptures in order to assess the stretch there.

The mould temperature was 100° C. Before forming, the films were pre-heated in a heating region. The heating time was 16 sec. in all tests, which gave a film temperature of approx. 150-160° C. In each case 5 films from the respective examples were formed one after the other for assessment. The assessment was carried out visually and the results are summarised in Tab. 7.

TABLE 7

| Example | HPF | Stretch | Assessment (forming/stretch) |
|---|---|---|---|
| No. 1 | ok | ok | +/+ |
| No. 2 | ok | ok | +/− |
| No. 3 | ok | ok | +/+ |
| No. 4 | ok | ok | +/+ |
| No. 5 | ok | cracks | +/− |
| No. 6 | ok | strong cracks | +/− |
| No. 7 | sticks at 80° C. | ok | −/+ |

The results showed that out of the laminates prepared using the ink according to the invention, only the laminate from Comparative Example 4 could be formed and stretched without damaging the entire laminate or ink layer.

Example 9

Results of the Insert Moulding Tests

The suitability for insert moulding of the coated films (laminates) prepared in accordance with examples 1 to 7 and formed in accordance with Example 8 was tested as described below. The same films as those from the forming test were used for assessment in the film insert moulding (FIM) process.

The tests were carried out on an injection moulding machine from Arburg. The Arburg Allrounder 570 C has a maximum mould clamping force of 200 to and was produced in 2003. The various films were insert moulded with PC/ABS at 260° C. The filling time was 2 sec and the injection pressure was measured at 1000 bar. The mould temperature was set at 60° C., as is standard. The mould has a hot runner nozzle that feeds the polymer via a cold runner and via ancillary lugs into the mould cavity. High temperatures and shear forces are produced during the process that may partially wash out the printed ink at excessive loading.

The adhesion of the insert moulded polymer to the ink was then assessed in a manual removal test.

The assessment was carried out visually and the results are summarised in Tab. 8.

TABLE 8

| Example | Wash-out | Adhesion | Assessment (wash-out/adhesion) |
|---|---|---|---|
| No. 1 | none | good | +/+ |
| No. 2 | none | good | +/+ |
| No. 3 | none | good | +/+ |
| No. 4 | high wash-out | none | −/− |
| No. 5 | none | low | +/− |
| No. 6 | none | none | +/− |
| No. 7 | none | none | +/− |

The results showed that only the laminates produced with use of the ink according to the invention could be insert moulded with a thermoplastic material, both without wash-out of the ink layer and with good adhesion between the laminate and the insert moulded material.

Example 10

Results of the Climate Test

In order to obtain a more detailed assessment of the adhesion between the printed film (laminate) and the insert moulding material, the moulded parts from Example 9 were subjected to climate storage. The tests were carried out under the following conditions in a climate cabinet from Weiss produced in 1989:
Temperature: 80° C.
Atmospheric humidity: 85%
Storage time: 100 hrs.

The films were then assessed visually and a manual removal test was also carried out. The results are shown in Tab. 9.

TABLE 9

| Example | Appearance | Adhesion | Assessment (appearance/adhesion) |
|---|---|---|---|
| No. 1 | ok | good | +/+ |
| No. 2 | ok | good | +/+ |
| No. 3 | ok | good | +/+ |
| No. 4* | not examined | not examined | none |
| No. 5 | severe blistering | none | −/− |
| No. 6 | severe blistering | none | −/− |
| No. 7 | blistering | none | −/− |

*The laminates according to Comparative Example 4 were not tested further in climate storage since the results according to Example 9 were already too poor for subsequent long-term climate storage.

The results showed that only the laminates produced with use of the ink according to the invention still exhibited a good appearance and good adhesion after climate storage. The comparative examples displayed blister formation and no longer exhibited adhesion.

Overall Assessment:

If the results of examples 8-10 are examined, i.e. for the entire process chain of forming and insert moulding of the printed films (laminates), the following overall picture is given for the examples:

TABLE 10

| Example | Forming | Insert Moulding | Climate Testing | Assessment |
|---|---|---|---|---|
| No. 1 | ok | ok | ok | + |
| No. 2 | slight cracks | ok | ok | + |
| No. 3 | ok | ok | ok | + |
| No. 4 | ok | wash-out | not examined | − |
| No. 5 | cracks | low adhesion | blistering | − |
| No. 6 | cracks | no adhesion | blistering | − |
| No. 7 | sticks | no adhesion | blistering | − |

Good thermoformability, stretchability during this preforming and suitability for insert moulding were observed for the laminates from examples 1 to 3, which were produced with use of the ink according to the invention. The adhesion of the insert moulding material to the printed film (the laminate according to the invention) was good, both directly after the insert moulding process and after storage in the climate chamber, and in addition no wash-out of the ink was observed. Comparative examples 4 to 7 exhibited some considerable weaknesses as early as the forming process in the form of significant crack formation in the ink layer or sticking of the entire laminate to the forming mould. All comparative examples exhibited either high wash-out of the ink from the ink layer, or no adhesion or else insufficient adhesion between the coated film and the insert moulding material during insert moulding and climate storage.

Example 11

Tab. 11 shows further non-limiting examples of suitable inks with a blue shade for different printing methods.

TABLE 11

Example of blue inks for different printing methods

| Raw material | Screen printing | Rotary screen printing | Flexographic printing | Digital printing |
|---|---|---|---|---|
| Polycarbonate 4 (30%) in 4-(1-oxo-2-propenyl)morpholine (70%) | | 31.00 | 15.40 | 5.00 |
| Polycarbonate 5 (35%) in 4-(1-oxo-2-propenyl)morpholine (65%) | 41.00 | | | |
| Aliphatic diacrylate (80%) in dipropylene glycol diacrylate (20%) | | | | 5.00 |
| 4-(1-oxo-2-propenyl)morpholine | | 4.00 | 8.60 | 23.00 |
| 1-ethenylazepan-2-one | 18.00 | 16.00 | 15.50 | 19.00 |
| 2-phenoxyethyl acrylate (SR339EU) | 24.10 | 22.00 | 21.00 | 26.00 |
| 1,6-hexanediol diacrylate | 5.00 | 5.00 | 5.00 | 5.00 |
| Polysiloxane | 1.00 | | | 0.10 |
| Acrylated antifoaming agent, silicone-free | | 2.50 | 2.50 | |
| Solsperse 5000 | | 0.10 | 0.40 | 0.05 |
| Solsperse 39000 | | 0.40 | 1.60 | 0.20 |
| Modified urea solution | 1.00 | | | |
| 2-hydroxy-2-methyl-1-phenyl-1-propanone | 5.00 | 7.50 | 7.50 | |
| 1-hydroxycyclohexyl phenyl ketone | | | | 7.50 |
| Diphenyl(2,4,6-trimethylbenzoyl)-phosphine oxide | | 7.50 | 7.50 | 7.50 |
| Phenyl bis (2,4,6-trimethylbenzoyl)-phosphine oxide | 0.90 | | | |
| Sunfast blue 15:3 249-1532 | 4.00 | 4.00 | | |
| Hostaperm blue B2G | | | 15.00 | 1.65 |

The invention claimed is:
1. Printing ink or printing varnish containing:
as a binder at least a non-radiation-curable aromatic polycarbonate based on a geminally distributed dihydroxy diphenyl cycloalkane, and as a solvent at least a radiation-curable monomer selected from the following group: acrylates, methacrylates, vinyl ethers, nitrogen-containing compounds with an ethylenically double bond,
wherein the polycarbonate is dissolved in the solvent and the solvent is bonded in chemically cross-linked form after curing in the printing ink or printing varnish.

2. The printing ink or printing varnish according to claim 1, wherein the radiation-curable monomers are a monomer mixture of different monomers, or only one type of radiation-curable monomers is provided for dissolving the polycarbonate.

3. The printing ink or printing varnish according to claim 1, wherein the radiation-curable monomers are UV-curable and/or electron-beam-curable.

4. The printing ink or printing varnish according to claim 1, wherein the printing ink or printing varnish contains photoinitiators.

5. The printing ink or printing varnish according to claim 1, wherein the printing ink or printing varnish is resistant under high temperature and flexible.

6. The printing ink or printing varnish according to claim 1, wherein the polycarbonate is thermoplastic.

7. The printing ink or printing varnish according to claim 1, wherein the polycarbonate has a molecular weight $M_w$ (weight average) of at least 10,000 and/or contains bifunctional carbonate structural units of formula (I),

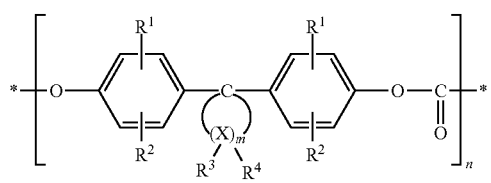
(I)

where
$R^1$ and $R^2$ represent hydrogen, halogen, $C_1$-$C_8$ alkyl, $C_5$-$C_6$ cycloalkyl, $C_6$-$C_{10}$ aralkyl, m represents an integer from 4 to 7, $R^3$ and $R^4$ represent, individually selectable for each X and independently of one another, hydrogen or $C_1$-$C_6$ alkyl and X represents carbon, with the proviso that $R^3$ and $R^4$ simultaneously represent alkyl on at least one atom X.

8. The printing ink or printing varnish according to claim 7, wherein the polycarbonate contains at least 30 mol % of the bifunctional carbonate structural units of formula (I).

9. The printing ink or printing varnish according to claim 1, wherein the polycarbonate has a molecular weight $M_w$ (weight average) of 10,000 to 300,000.

10. The printing ink or printing varnish according to claim 1, wherein the printing ink or printing varnish contains at least one additional resin and/or at least one additive and/or at least one filler and/or at least one pigment and/or at least one wax and/or at least one additional adhesion promoter.

11. The printing ink or printing varnish according to claim 1, wherein the softening temperature of the radiation-cured printing ink or printing varnish is <230° C.

12. The printing ink or printing varnish according to claim 1, wherein the polycarbonate is not curable by radiation curing.

13. The printing ink or printing varnish according to claim 11, wherein the softening temperature of the radiation-cured printing ink or printing varnish is <180° C.

* * * * *

UNITED STATES PATENT AND TRADEMARK OFFICE
CERTIFICATE OF CORRECTION

PATENT NO. : 8,580,878 B2  Page 1 of 1
APPLICATION NO. : 12/992395
DATED : November 12, 2013
INVENTOR(S) : Hauck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 52 days.

Signed and Sealed this
Twenty-second Day of September, 2015

Michelle K. Lee
*Director of the United States Patent and Trademark Office*